(12) United States Patent
Lin

(10) Patent No.: US 10,239,349 B2
(45) Date of Patent: Mar. 26, 2019

(54) FOLDABLE CHAIR HAVING LEG STRENGTHENING MEANS

(71) Applicant: SPEC SEATS TECHNOLOGIES INC., Chung-Li, Taoyuan Hsien (TW)

(72) Inventor: Mei Chuen Lin, Taoyuan Hsien (TW)

(73) Assignee: SPEC SEATS TECHNOLOGIES INC., Chung-Li (TW)

( * ) Notice: Subject to any disclaimer, the term of this patent is extended or adjusted under 35 U.S.C. 154(b) by 72 days.

(21) Appl. No.: 15/668,120

(22) Filed: Aug. 3, 2017

(65) Prior Publication Data

US 2019/0039411 A1    Feb. 7, 2019

(51) Int. Cl.
| A47C 4/00 | (2006.01) |
| B60B 33/00 | (2006.01) |
| A47C 4/14 | (2006.01) |
| A47C 4/24 | (2006.01) |

(52) U.S. Cl.
CPC ............ *B60B 33/0026* (2013.01); *A47C 4/14* (2013.01); *A47C 4/24* (2013.01)

(58) Field of Classification Search
CPC .. A47C 4/14; A47C 4/24; A47C 7/006; A47C 4/04
See application file for complete search history.

(56) References Cited

U.S. PATENT DOCUMENTS

| 7,108,330 | B2 * | 9/2006 | Mizelle | A47C 4/06 297/218.1 |
|---|---|---|---|---|
| 7,338,116 | B1 * | 3/2008 | Lin | A47C 4/24 297/452.14 |
| 7,410,211 | B1 * | 8/2008 | Lin | A47C 4/24 16/31 A |
| 7,954,891 | B2 * | 6/2011 | Lin | A47C 4/24 297/28 |
| 8,371,645 | B2 * | 2/2013 | Lin | A47C 4/04 297/23 |
| 8,506,008 | B2 * | 8/2013 | Pan | A47C 3/045 297/160 |
| 8,684,452 | B2 * | 4/2014 | Lin | A47C 7/50 297/423.1 |
| D733,448 | S  * | 7/2015 | Lin | D6/368 |
| 10,083,638 | B2 * | 9/2018 | Lin | G09F 13/06 |
| 2008/0185879 | A1 * | 8/2008 | Lin | A47C 4/24 297/46 |
| 2008/0203773 | A1 * | 8/2008 | Bateman | A47C 3/34 297/16.1 |

(Continued)

*Primary Examiner* — Shin H Kim
(74) *Attorney, Agent, or Firm* — Rabin & Berdo, P.C.

(57) ABSTRACT

A foldable chair includes a chair body having two front legs, two rear legs connected pivotally to the two front legs; a seat disposed on the chair body; a backrest disposed on the chair body so as to be located above the seat; four leg support elements attached respectively to bottom ends of the two front legs and the two rear legs; four casters attached respectively to bottom sides of the leg support elements; two reinforcing plates attached respectively to inner sides of the two front legs and spaced at a predetermined distance from the leg support elements; and two strengthening rigs attached respectively to the two front legs and extending into the front and rear legs to an extent beyond bottom ends so as to be located between the reinforcing plates and the leg support elements, thereby strengthening the front and rear legs.

8 Claims, 9 Drawing Sheets

(56) References Cited

U.S. PATENT DOCUMENTS

| | | | |
|---|---|---|---|
| 2009/0091176 A1* | 4/2009 | Lin | A47C 31/00 297/463.1 |
| 2011/0180501 A1* | 7/2011 | Lin | A47B 81/00 211/85.8 |
| 2011/0227373 A1* | 9/2011 | Cone, II | B62B 7/08 297/16.1 |
| 2018/0226004 A1* | 8/2018 | Lin | G09F 13/06 |

* cited by examiner

FOLDABLE CHAIR HAVING LEG STRENGTHENING MEANS

BACKGROUND OF THE INVENTION

1. Field of the Invention

The present invention relates generally to a foldable chair, and more particularly a foldable chair having leg strengthening means to provide extra rigidity of the front and rear legs of the foldable chair.

2. The Prior Arts

Foldable chairs are easy to be folded and thus occupy a little room and are preferred to when compared to traditional chairs, which occupy relatively large room. FIGS. 1 and 2 illustrate fragmentary views of a conventional foldable chair with casters A4 to facilitate movement from one place to the other. A conventional foldable chair includes a chair body (not visible) having two front legs A111 (only one is shown) and two rear legs connected pivotally to the two front legs A111; a seat disposed on the chair body; a backrest disposed on the chair body so as to be located above the seat; a plurality of leg support elements A3 attached to bottom ends of the front legs A111 and the rear legs respectively; a plurality of casters A4 attached respectively to bottom sides of the leg support elements A3; and two reinforcing plates A5 attached respectively to inner sides of the two front legs A111, thereby reinforcing the rigidity of the front leg A111 or the chair body.

As best shown in FIG. 2, to compensate insufficient endurance caused by an over weight person sitting on the chair, two reinforcing plates A5 are attached respectively to inner sides of the front legs A111.

However, it is noted that the bottom ends of the reinforcing plates A5 are spaced from the corresponding leg support elements A3 by a predetermined distance B, which means that each front leg A111 has a portion equivalent to the predetermined distance B is relatively weak owing to lack of being reinforced by the reinforcing plate A5. In other words, the entire length of the front leg A111 or the chair body is not reinforced and hence undesired breakage of the front leg A111 is still possible if relatively heavy person is seated on the seat of the conventional foldable chair. In addition, due to presence of the casters in the conventional foldable chair and since the bottom ends of the front and rear legs are mounted on the casters, which have only a portion and not the entire area of the casters in contact with the supporting surface, thus the total rigidity is weaken.

SUMMARY OF THE INVENTION

A primary objective of the present invention is to provide a foldable chair having strengthening means that can strengthen the entire lengths of front and rear legs of the foldable chair, thereby increasing the rigidity of the chair body as well as the casters such that the seat and/or the front and rear legs thereof can withstand a relatively heavy weight person when sitting on the seat.

In order to achieve the preceding objective, a foldable chair with leg strengthening means of the present invention includes: a chair body; a seat; a backrest; a plurality of leg support elements; a plurality of casters; two reinforcing plates; and two strengthening structures.

The chair body includes a first frame having two front legs and a second frame having two rear legs connected pivotally to the two front legs.

The seat is disposed on the chair body.

The backrest is disposed on the chair body so as to be located above the seat.

The plurality of leg support elements are attached respectively to bottom ends of the two front legs and the two rear legs.

The plurality of casters are attached respectively to bottom sides of the leg support elements.

The two reinforcing plates are attached respectively to inner sides of the two front legs and are spaced from the corresponding leg support elements by a predetermined distance.

The two strengthening structures are attached respectively to the two front legs and extend between the reinforcing plates and the leg support elements.

Preferably, the two strengthening structures include a certain portion connected in such a manner to strengthen the reinforcing plates and some parts of the two front legs and a remaining portion strengthening some parts of the leg support elements and remaining parts of the two front legs.

In one embodiment of the present invention, each of the two front legs is fabricated from a planner plate by rolling two opposite sides so as to form parallel hollow front and rear tubes defining front and rear insert holes respectively, a middle plate interconnecting the front and rear tubes. Each of the two strengthening structures includes a front and rear strengthening rib having upper rib parts inserted into the front and rear insert holes extending beyond bottom ends of the reinforcing plates and lower rib parts seated on the leg support element such that an assembly of the leg support element, the front and rear strengthening ribs and the reinforcing plates cooperatively strengthen the rigidity of the front legs.

Preferably, the front tube has a longitudinal length greater than the rear tube of the front leg such that the front strengthening rib extending into the front tube is longer than the rear strengthening rib extending into the rear tube such that the front leg is inclined with respect to a horizontal surface.

In one embodiment, each of the leg support elements includes a basic seat, front and rear protrusive parts projecting upwardly from front and rear ends of the basic seat, and a middle coupling part projecting upwardly and located between the front and rear protrusive parts so as a define an inclined front recess in front of the middle coupling part and an inclined rear recess behind the middle coupling part, wherein the middle coupling part has a height greater than the front and rear protrusive parts and is formed with a slit in the front and rear direction, thereby dividing the middle coupling part into a minor coupling block and a major coupling block. After fabrication of the front leg, the front and rear tubes and the middle plate cooperatively define a receiving groove such that attachment of the bottom end of the front leg relative to the leg support element results in simultaneous insertion of the middle plate within the slit and the major coupling block into the receiving groove while bottom ends of the front tube and the front strengthening rib are seated within the inclined front recess and bottom ends of the rear tube and the rear strengthening rib are seated in the inclined rear recess of the leg support element.

Preferably, after attachment of the bottom end of the front leg relative to the leg support element, the top ends of the front and rear strengthening ribs are flush with each other owing to inclined front and rear recesses in the basic seat.

Preferably, the front and rear strengthening ribs are fabricated from metal and are columns or have cylindrical shapes.

Preferably, the front and rear strengthening ribs are fabricated from iron metal in form of columns or cylindrical shapes.

One distinct feature of the present invention resides in that there exists a weak portion of the front leg. However, the strengthening structures employed in the present foldable chair includes front and rear strengthening ribs having upper parts inserted into the front and rear insert holes in the front and rear tubes to an extent beyond the bottom ends of the reinforcing plate while lower parts of front and rear strengthening ribs are seated within the inclined front and rear recesses of the leg support element such that the assembly constituted by the leg support element, the front and rear strengthening ribs and the reinforcing plates cooperatively strengthen the entire rigidity of the front legs and the chair body. In other words, the abovementioned weak portion of the front leg is strengthened so do the casters in such a manner that a relatively heavy person can sit on the seat of the foldable chair of the present invention without causing break up of the front and rear legs or the chair body.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
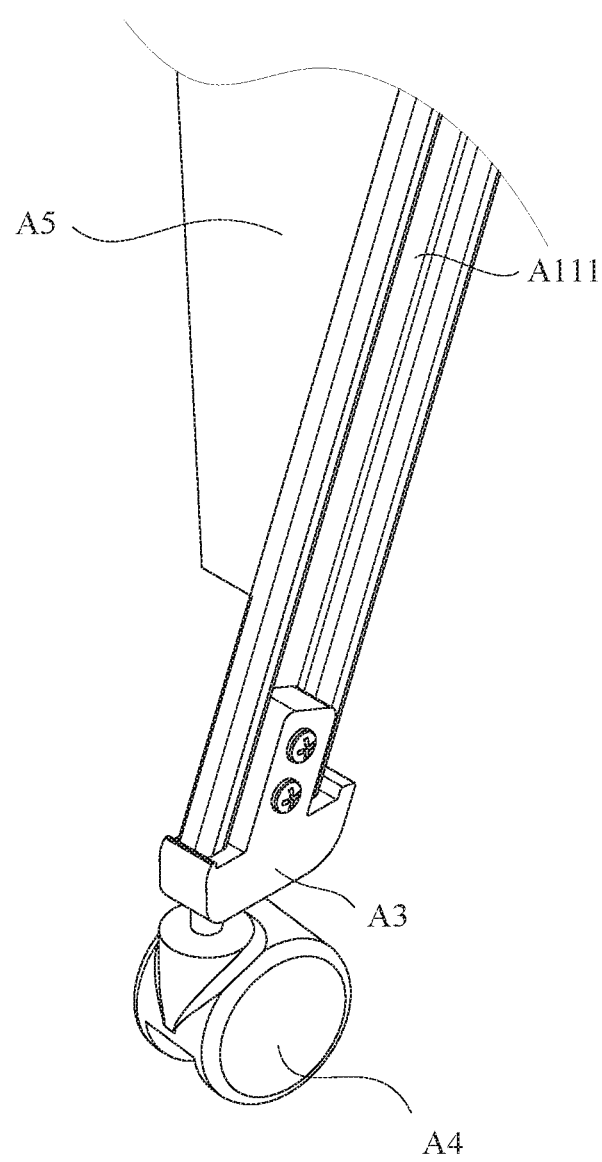
FIG. 1 is a schematic fragmentary of a conventional foldable chair.
Figure 2:
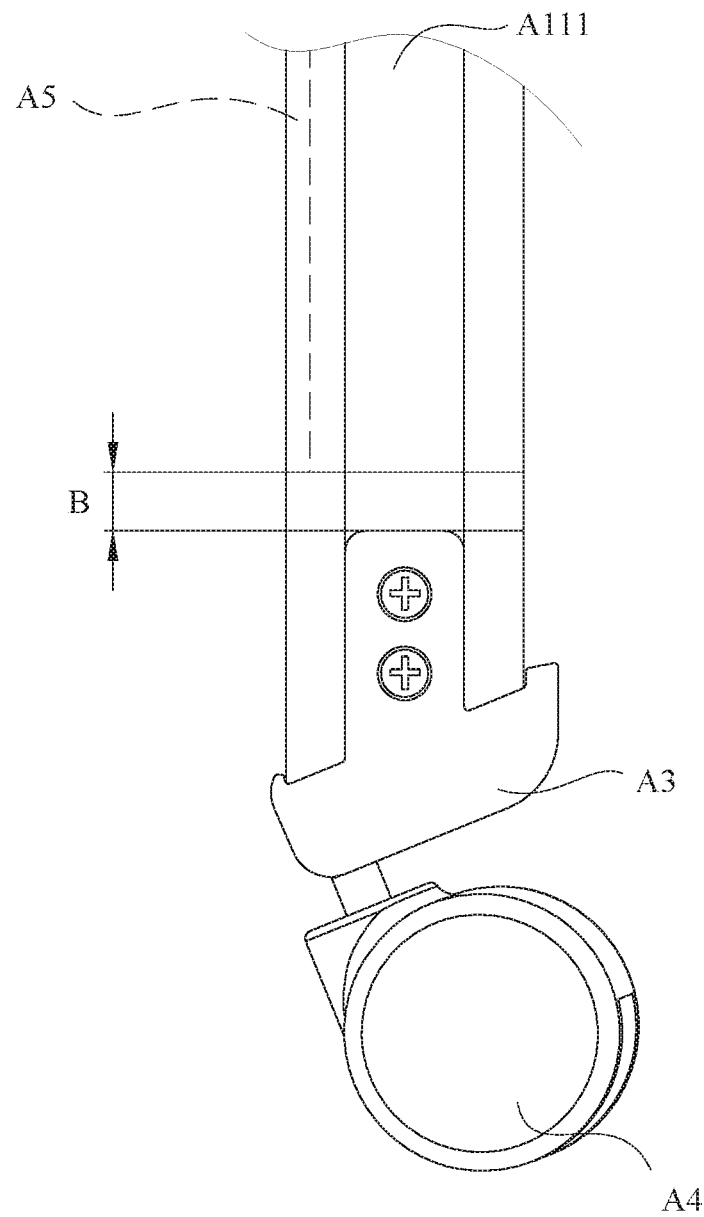
FIG. 2 is an enlarged fragmentary view of a leg in the conventional foldable chair.
Figure 3:
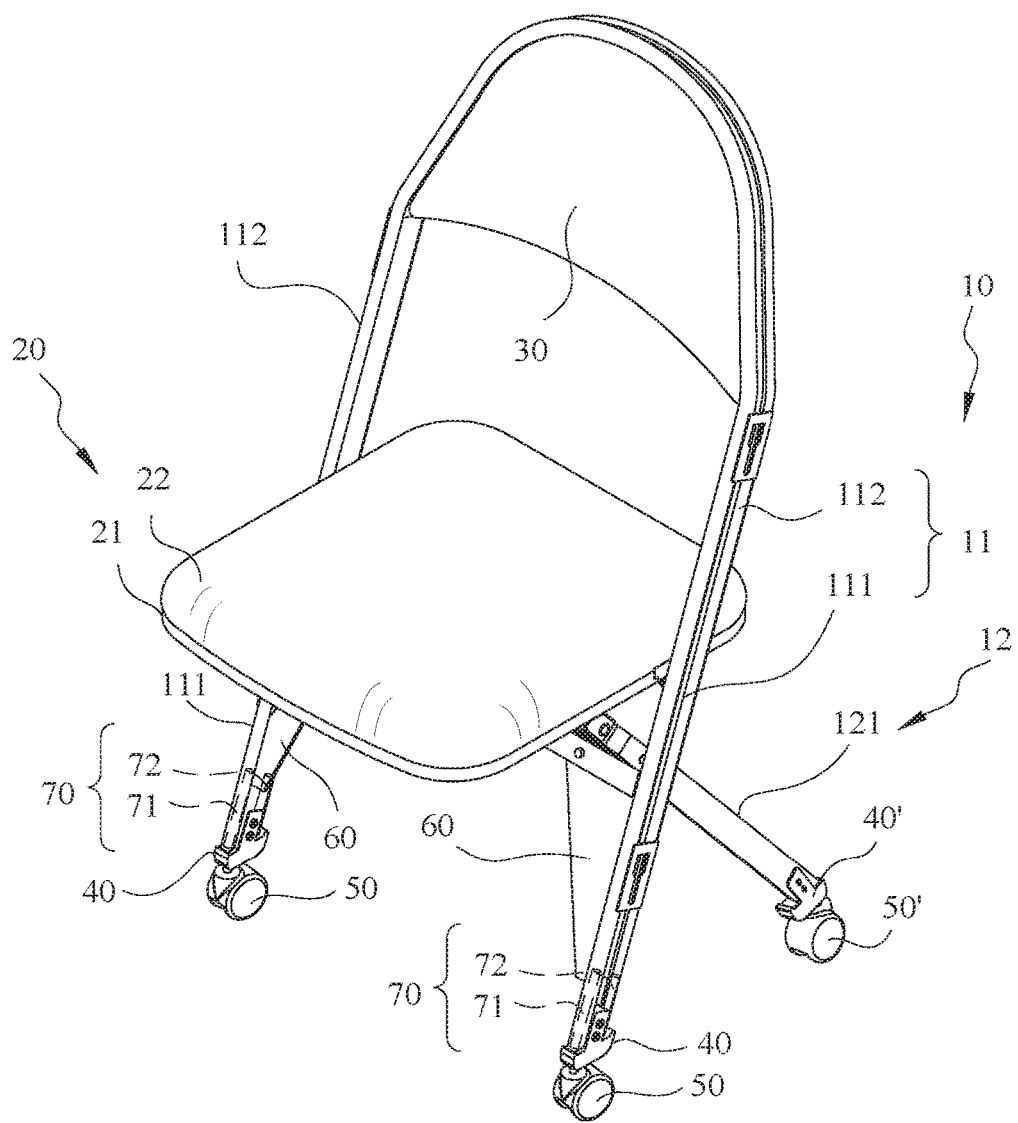
FIG. 3 is a perspective view of a foldable chair of the present invention with leg strengthening means.
Figure 4:
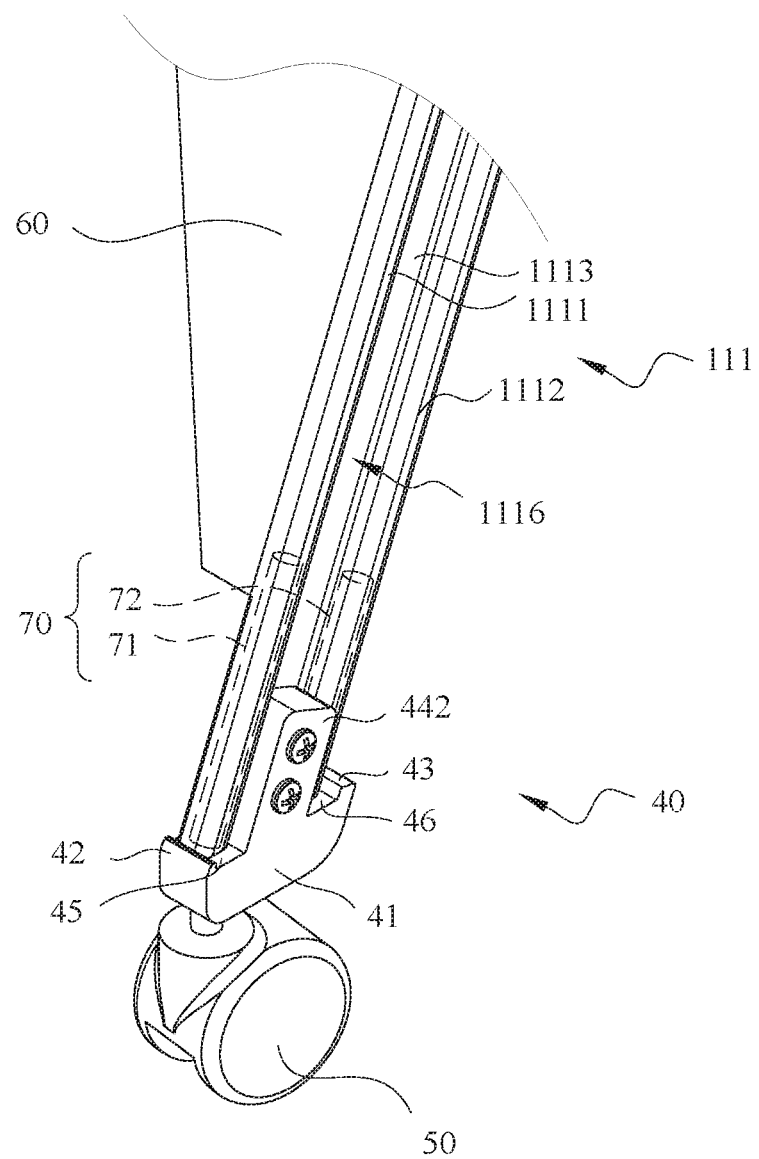
FIG. 4 is a fragmentary view of a leg employed in the foldable chair of the present invention.
Figure 5:
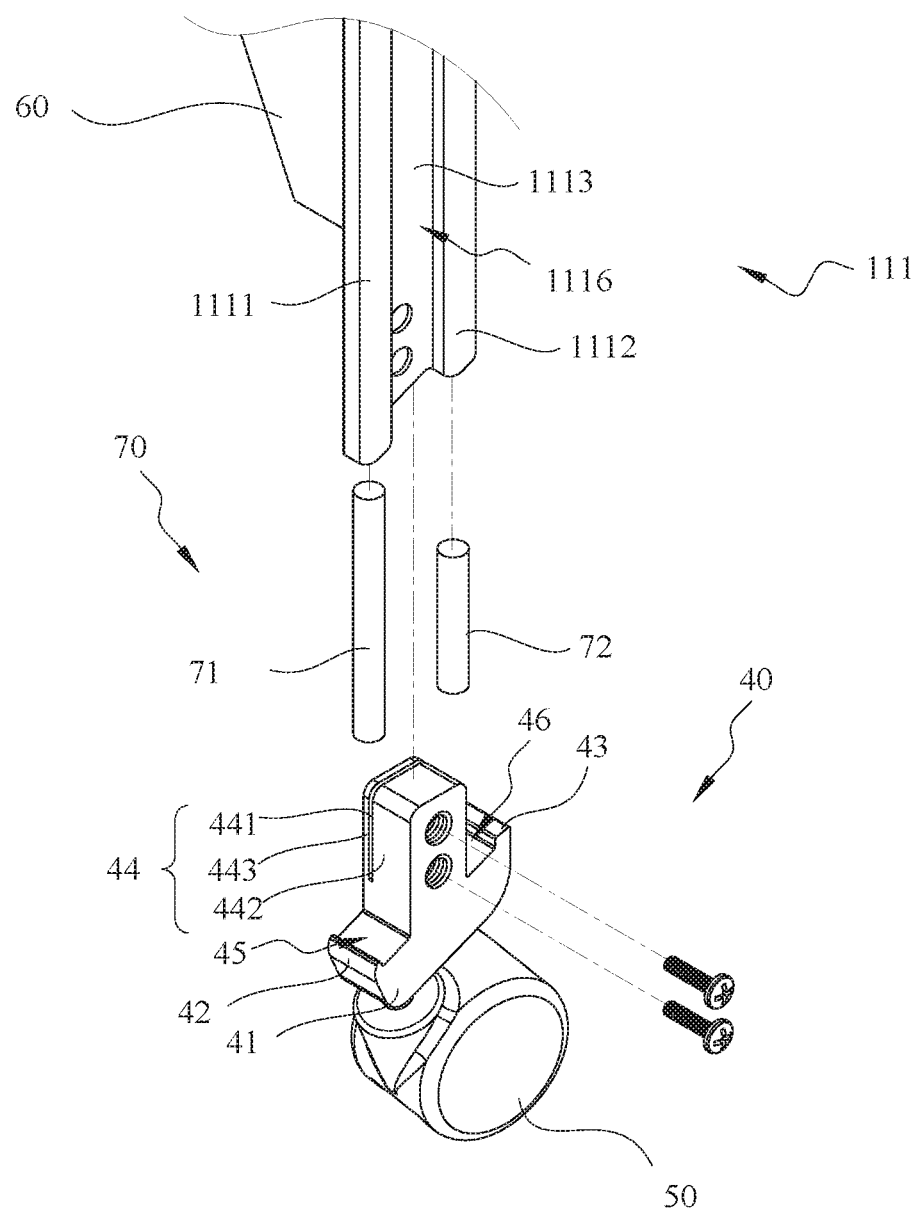
FIG. 5 is an exploded and fragmentary view of a leg employed in the foldable chair of the present invention.
Figure 6:
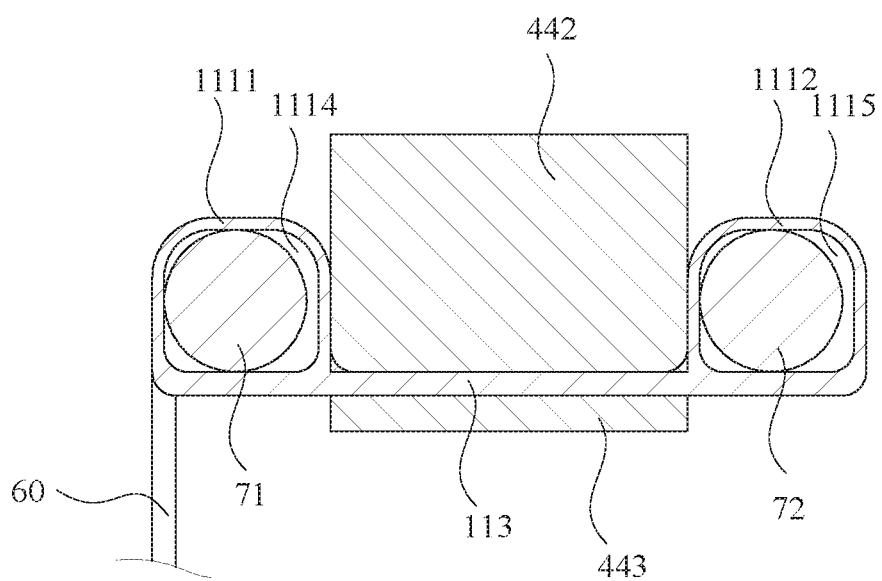
FIG. 6 is a fragmentary cross-sectional view of the leg employed in the foldable chair of the present invention.
Figure 7:
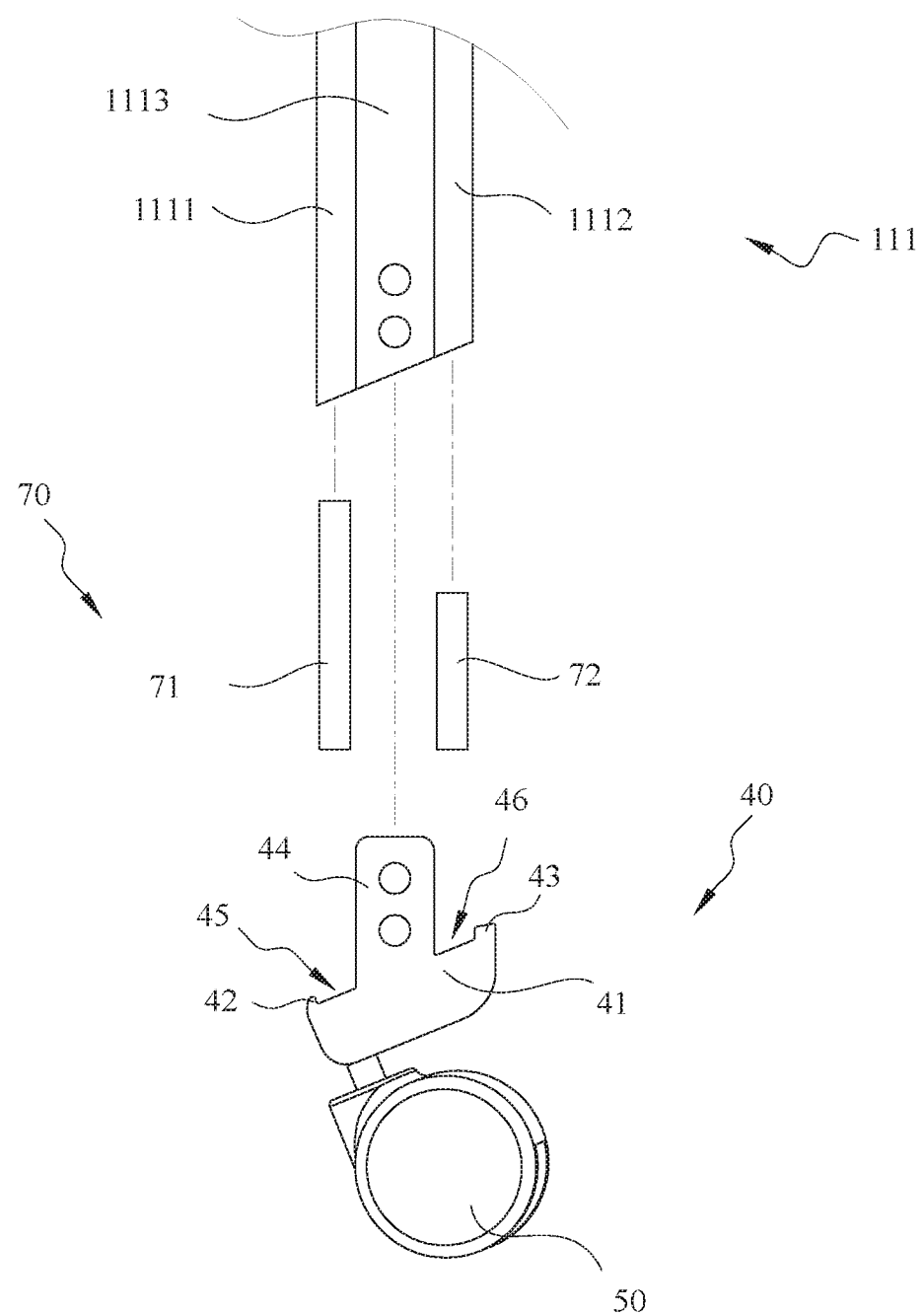
FIG. 7 is an exploded and fragmentary view of the leg employed in the foldable chair of the present invention.
Figure 8:
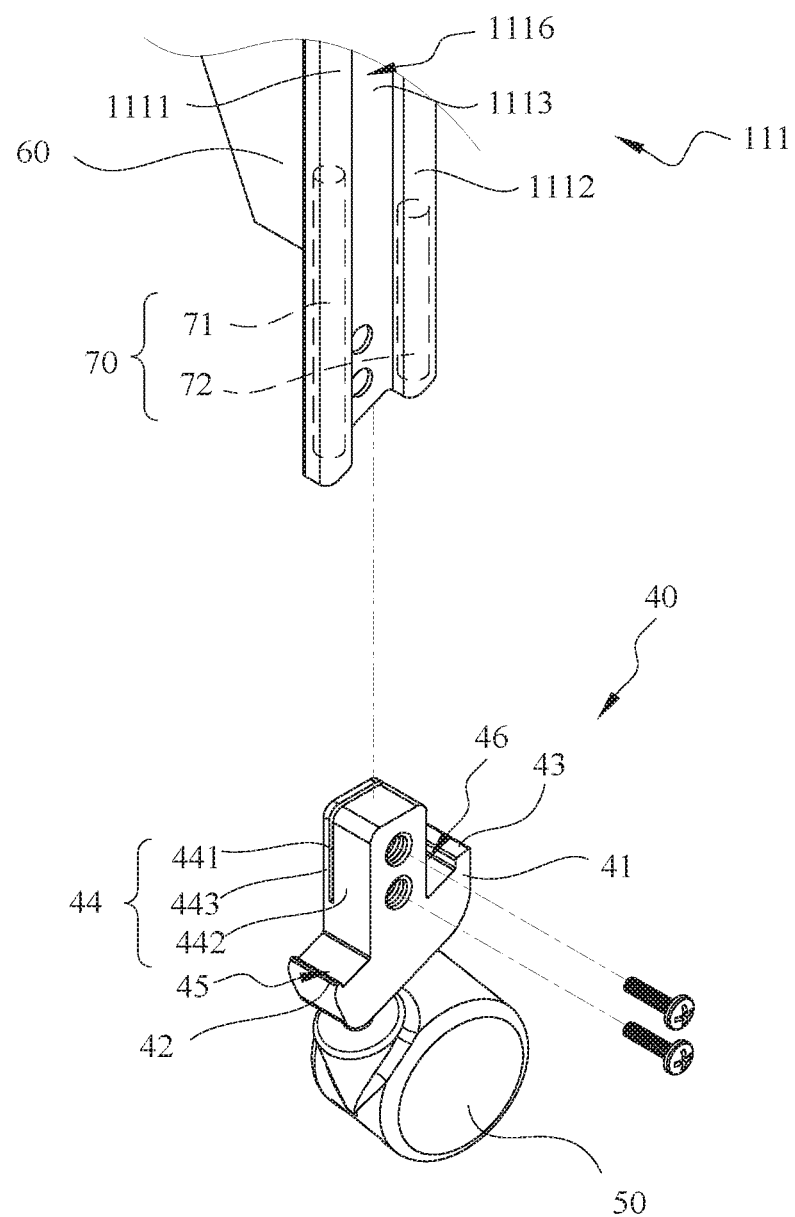
FIG. 8 is an exploded and fragmentary view of the leg employed in the foldable chair of the present invention shown in FIG. 7 from another angle.
Figure 9:
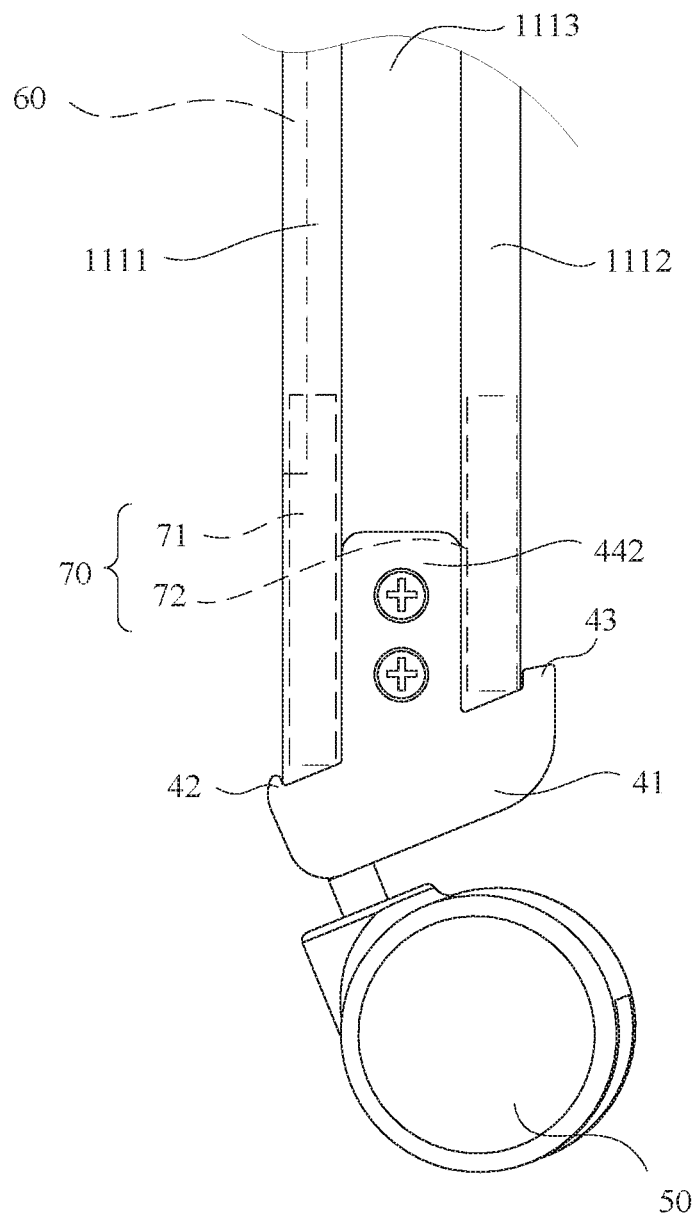
FIG. 9 is an enlarged, fragmentary and assembled view of the leg employed in the foldable chair of the present invention.

Referring to FIGS. 3-9, wherein FIG. 3 is a perspective view of a foldable chair of the present invention with leg strengthening means; FIG. 4 is a fragmentary view of a leg employed in the foldable chair of the present invention; FIG. 5 is an exploded and fragmentary view of a leg employed in the foldable chair of the present invention; FIG. 6 is a fragmentary cross-sectional view of the leg employed in the foldable chair of the present invention; FIG. 7 is an exploded and fragmentary view of the leg employed in the foldable chair of the present invention; FIG. 8 is an exploded and fragmentary view of the leg employed in the foldable chair of the present invention shown in FIG. 7 from another angle; and FIG. 9 is an enlarged, fragmentary and assembled view of the leg employed in the foldable chair of the present invention.

As shown, a foldable chair with leg strengthening means according to the present invention includes a chair body 10, a seat 20, a backrest 30, four leg support elements 40, 40', four casters 50, 50', two reinforcing plates 60 and two strengthening structures 70.

The chair body 10 includes a first frame 11 having two front legs 111 and a second frame 12 having two rear legs 121 connected pivotally to the two front legs 111. To be more specific, the chair body 10 is generally inverted U-shaped body 112 and the two front legs 111 extend integrally therefrom. The second frame 12 further has at least one connection rod (not visible) fixed between the rear legs 121 to reinforce the same. As best shown in FIG. 3, each of the two front legs 111 is fabricated from a planner plate by rolling two opposite sides so as to form parallel hollow front and rear tubes 1111, 1112 defining front and rear insert holes 1114, 1115 respectively and a middle plate 1113 interconnecting the front and rear tubes 1111, 1112. To be more specific, the front and rear tubes 1111, 1112 and the middle plate 1113 cooperatively defines a receiving groove 1116 in the front leg 111. The front and rear tubes 1111, 1112 are rectangular cross section, wherein the front tube 1111 has a longitudinal length greater than the rear tube 1112 such that after assembly of the foldable chair of the present invention the front and rear legs 111, 121 are inclined with respect to a horizontal surface, the purpose of which will be explained in the following paragraphs. Each rear leg 121 has the same structure as the front leg 111 such that its detailed explanation is omitted herein for the sake of brevity.

The seat 20 is disposed on the chair body 10. Preferably, the seat 20 includes a seat frame 21 connected pivotally to the rear legs 121 and a cushion piece 22 mounted on the seat frame 21, as best shown in FIG. 3.

The backrest 30 is disposed on the chair body 10 so as to be located above the seat 20, as best shown in FIG. 3.

The leg support elements 40, 40' are attached respectively to bottom ends of the two front legs 111 and the two rear legs 121. Since the leg support elements 40, 40' attached respectively to the bottom ends of the front and rear legs have the same structure, only one is used to explain its structure. Referring to FIGS. 4-9, each of the leg support elements 40 includes an elongated basic seat 41, front and rear protrusive parts 42, 43 projecting upwardly from front and rear ends of the basic seat 41, and a middle coupling part 44 projecting upwardly and located between the front and rear protrusive parts 42, 43 so as a define an inclined front recess 45 in front of the middle coupling part 44 and an inclined rear recess 46 behind the middle coupling part 44, wherein the middle coupling part 44 has a height taller than the front and rear protrusive parts 42, 43 and is formed with a slit 441 in the front and rear direction, thereby dividing the middle coupling part 44 into a minor coupling block 443 and a major coupling block 442. After fabrication, the front and rear tubes 1111, 1112 and the middle plate 1113 cooperatively define a receiving groove 1116 in the front leg 111, such that attachment of the bottom end of the front leg 111 relative to the leg support element 40 results in simultaneous insertion of the middle plate 1113 within the slit 441 and the major coupling block 442 into the receiving groove 1116 while bottom end of the front tube 1111 is seated within the inclined front recess 45 and bottom end of the rear tube 1112 is seated in the inclined rear recess 46 of the leg support element 40.

The four casters 50, 50' are attached rotatably and respectively to the basic seat 41 of the leg support elements 40, 40' such that due to presence of the casters 50, 50', the foldable chair of the present invention can be moved easily from one place to the other. If required, the casters 50, 50' can be removed from the basic seats 41 of the leg support elements 40, 40' so as to place the leg support elements 40, 40' directly on a supporting surface, thereby providing constant stability of the foldable chair of the present invention.

The two reinforcing plates 60 are attached respectively to inner sides of the two front legs 111 such that the lowest most ends of the reinforcing plates 60 are spaced apart from the leg support elements 40 by a predetermined distance. In other words, only a portion of the front leg 111 is reinforced except the portion of the front leg 111 equivalent to the predetermined distance.

The strengthening structures 70 are attached respectively to the two front legs 111 and extend between the reinforcing plates 60 and the leg support elements 40. As best shown in FIGS. 3 and 4, the strengthening structures 70 include a certain portion connected in such a manner to strengthen the reinforcing plates 60 and some parts of the two front legs 111 and a remaining portion strengthening some parts of the leg support elements 40 and remaining parts of the two front legs 111 such that the entire portion of the front legs 111 as well as the casters 50 are strengthened to increase the rigidity of the front legs 111 to permit sitting of a relatively heavy person on the seat 20.

Preferably, each of the two strengthening structures 70 includes front and rear strengthening ribs 71, 72 having lower rib parts fixed securely within the inclined front recess 45 and the inclined rear recess 46 of the leg support element 40 and upper rib parts inserted into the front and rear insert holes 1114, 1115 in the front and rear tubes 1111, 1112 to extend beyond the lowest most ends of the reinforcing plates 60 (see FIG. 9) and such that an assembly of the leg support element 40, the front and rear strengthening ribs 71, 72 and the reinforcing plates 60 cooperatively strengthen the rigidity of the front leg 111.

To be more specific, the front strengthening rib 71 has a longitudinal length greater than that of the rear strengthening rib 72, but after installation of the front and rear strengthening ribs 71, 72 within the front and rear tubes, the top ends of the front and rear strengthening ribs 71, 72 extend into the front and rear tubes 1111, 1112 to an extent beyond the lowest most ends of the reinforcing plate 60 and are flush with each other by virtue of the inclined front and rear recesses 45, 46 in which the bottom ends of the front and rear strengthening ribs 71, 72 are fixed securely therein. In other words, the entire longitudinal length of the front legs 111 is uniformly strengthened.

More preferably, the front and rear strengthening ribs 71, 72 are fabricated from metal and are columns or have cylindrical shapes. To be more specific, the front and rear strengthening ribs 71, 72 are fabricated from iron metal in form of columns or cylindrical shapes. In other words, the materials of the front and rear strengthening ribs 71, 72 implicitly enhance the rigidity of the front legs 111. However, the materials and its configuration should not be limited only to the disclosed ones, many other materials and configuration can be included. In the present embodiment, each of the leg support elements 40, 40' is formed with two screw holes while the middle plate 1113 is formed with two through holes to permit extension of the fastening screws for coupling the leg support element 40, 40' and the front legs 111 securely together.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A foldable chair with leg strengthening means, comprising:
    a chair body including a first frame having two front legs and a second frame having two rear legs connected pivotally to said two front legs;
    a seat disposed on said chair body;
    a backrest disposed on said chair body so as to be located above said seat;
    a plurality of leg support elements attached respectively to bottom ends of said two front legs and said two rear legs;
    a plurality of casters attached respectively to bottom sides of said leg support elements;
    two reinforcing plates attached respectively to inner sides of said two front legs and spaced at a predetermined distance from the corresponding said leg support elements; and
    two strengthening structures attached respectively to said two front legs and extending between the reinforcing plates and said leg support elements.

2. The foldable chair according to claim 1, wherein said two strengthening structures include a certain portion connected in such a manner to strengthen said reinforcing plates and some parts of said two front legs and a remaining portion to strengthen some parts of said leg support elements and remaining parts of said two front legs.

3. The foldable chair according to claim 2, wherein each of said two front legs is fabricated from a plane plate by rolling two opposite sides so as to form parallel hollow front and rear tubes defining front and rear insert holes respectively, a middle plate interconnecting said front and rear tubes, each of said two strengthening structures including a front and rear strengthening rib having upper rib parts inserted into said front and rear insert holes extending beyond bottom ends of said reinforcing plates and lower rib parts seated on said leg support element such that an assembly of said leg support element, said front and rear strengthening ribs and said reinforcing plates cooperatively strengthen the rigidity of said front legs.

4. The foldable chair according to claim 3, wherein said front tube has a longitudinal length greater than said rear tube of said front leg such that said front strengthening rib extending into said front tube is longer than said rear strengthening rib extending into said rear tube such that said front leg is inclined with respect to a horizontal surface.

5. The foldable chair direction according to claim 4, wherein each of said leg support elements includes a basic seat, front and rear protrusive parts projecting upwardly from front and rear ends of said basic seat, and a middle coupling part projecting upwardly and located between said front and rear protrusive parts so as to define an inclined front recess in front of said middle coupling part and an inclined rear recess behind said middle coupling part, wherein said middle coupling part has a height greater than said front and rear protrusive parts and is formed with a slit in the front and rear direction, thereby dividing said middle coupling part into a minor coupling block and a major coupling block, wherein said front and rear tubes and said middle plate cooperatively defining a receiving groove in said front leg such that attachment of said bottom end of said front leg relative to said leg support element results in simultaneous insertion of said middle plate within said slit and said major coupling block into said receiving groove while bottom ends of said front tube and said front strengthening rib are fixed within said inclined front recess and bottom ends of said rear tube and said rear strengthening rib are fixed within said inclined rear recess of said leg support element.

6. The foldable chair according to claim 5, wherein after attachment of said bottom end of said front leg relative to said leg support element, top ends of said front and rear strengthening ribs are flush with each other.

7. The foldable chair according to claim 3, wherein said front and rear strengthening ribs are fabricated from metal and are columns or have cylindrical shapes.

8. The foldable chair according to claim 7, wherein said front and rear strengthening ribs are fabricated from iron in form of columns or cylindrical shapes.

* * * * *